(12) United States Patent
Lichtinger

(10) Patent No.: US 6,579,487 B1
(45) Date of Patent: Jun. 17, 2003

(54) METHOD AND APPARATUS FOR FORMING A THERMOPLASTIC PART WITH INJECTED ELASTOMER SEAL

(75) Inventor: Peter Lichtinger, Fürstenfeldbruck (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 09/807,334

(22) PCT Filed: Oct. 15, 1999

(86) PCT No.: PCT/EP99/07821

§ 371 (c)(1),
(2), (4) Date: Apr. 11, 2001

(87) PCT Pub. No.: WO00/23241

PCT Pub. Date: Apr. 27, 2000

(30) Foreign Application Priority Data

Oct. 20, 1998 (DE) .......................... 198 48 246

(51) Int. Cl.⁷ .......................... B29C 45/16; B29C 37/00
(52) U.S. Cl. .................. 264/255; 264/266; 264/327; 425/112; 425/547
(58) Field of Search .................. 425/112, 547; 264/266, 327, 255

(56) References Cited

U.S. PATENT DOCUMENTS

| | | | | |
|---|---|---|---|---|
| 2,609,570 A | * | 9/1952 | Danielson et al. ......... | 425/112 |
| 4,269,802 A | * | 5/1981 | Linne ......................... | 264/255 |
| 5,008,060 A | * | 4/1991 | Kanai et al. ................ | 264/255 |
| 5,160,474 A | | 11/1992 | Huff ........................... | 264/255 |
| 5,246,065 A | | 9/1993 | Huff ........................... | 264/255 |
| 5,271,880 A | * | 12/1993 | Lindsay ..................... | 264/255 |
| 5,324,470 A | * | 6/1994 | Comert et al. .............. | 264/255 |

FOREIGN PATENT DOCUMENTS

| | | |
|---|---|---|
| EP | 0 017300 A | 10/1980 |
| JP | 60-052322 A | 3/1985 |
| JP | 02-179714 A | 7/1990 |
| JP | 03-140220 A | 6/1991 |

* cited by examiner

*Primary Examiner*—Robert Davis
(74) *Attorney, Agent, or Firm*—Henry M. Feiereisen

(57) ABSTRACT

The invention relates to a process for manufacturing a thermoplastic part (1) with an injected seal (3) as well as to an injection molding apparatus and a corresponding thermoplastic part. For injecting the seal, a groove (2) is formed during molding of the thermoplastic part (1) in which groove liquid crosslinked plastic as material for the seal (3) is injected. Sealing projections (12) are formed on the groove edge and/or on the injection mold in order to prevent an overflowing beyond the groove edges during injection. When closing the mold, undercuts (6) are formed on the upper edge of the groove for holding the solidified seal (3) in the groove.

14 Claims, 2 Drawing Sheets

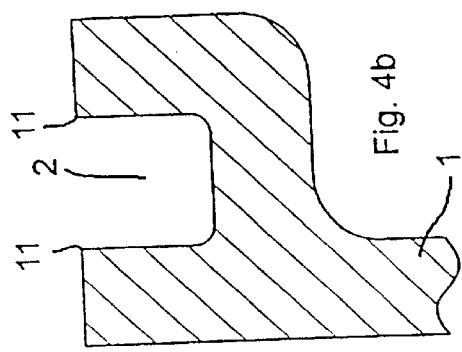
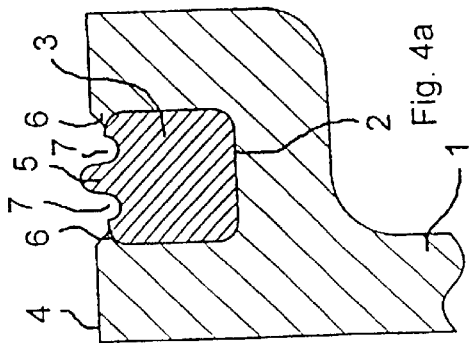
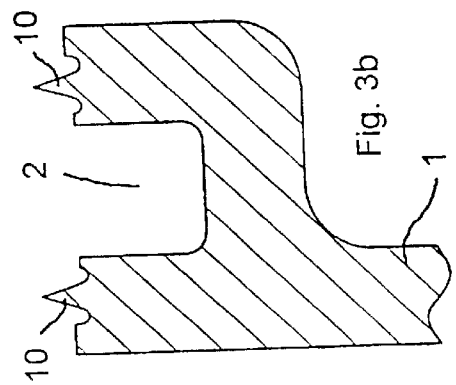
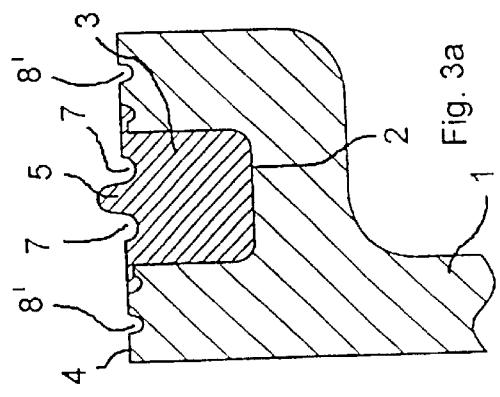
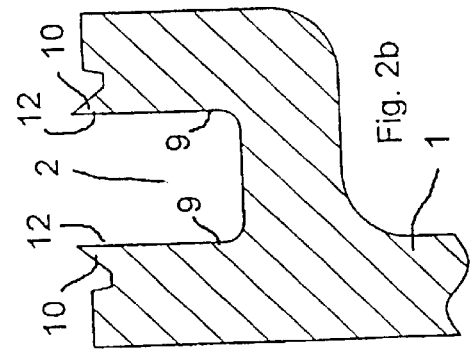
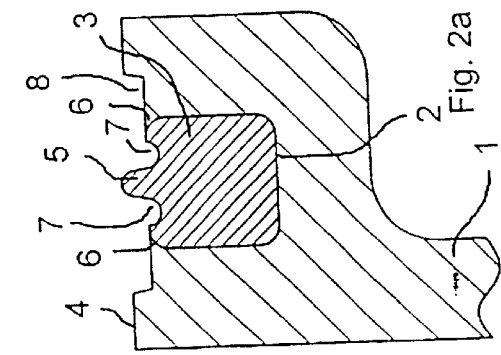
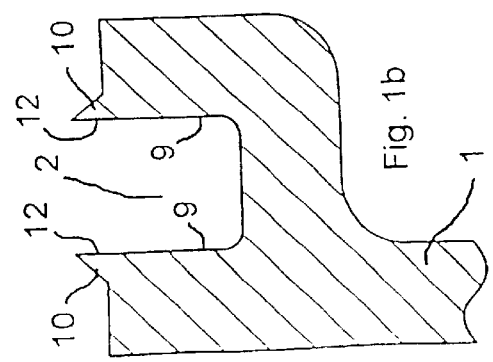
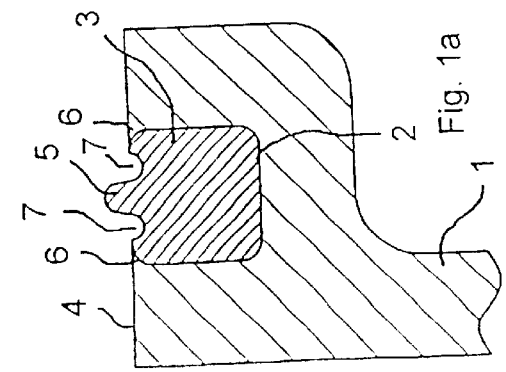

METHOD AND APPARATUS FOR FORMING A THERMOPLASTIC PART WITH INJECTED ELASTOMER SEAL

BACKGROUND OF THE INVENTION

The present invention relates to a thermoplastic part with an injected elastomer seal, to a manufacturing process for a thermoplastic part with an injected elastomer seal, as well as to an injection molding apparatus for carrying out the process.

Thermoplastic parts with elastomer seals are used, for example, in the engine space of passenger cars or as housing of all type in the electrical industry. Oftentimes, it is required that these parts reliably retain their sealing function against water, oil etc. even after being dismantled for several times. The same is also true when exposed to extreme temperature stress. In view of their great elasticity over long periods and even at high temperatures (150°–200° C.), seals of crosslinked plastics (e.g. rubber or LSR (liquid silicon rubber)) are very often used. Thermoplastic parts with seals of crosslinked plastics are, however, complicated and expensive to manufacture. The thermoplastic part is manufactured with a moderately heated mold (about 30–90° C.), whereas the production of seals of crosslinked plastics requires the use of heated molds at temperatures of about 170–200° C., so that it is a problem to manufacture both in a mold or in a fully automated process. Moreover, crosslinked plastics are very liquid during processing in the mold so that common sealing methods are insufficient in molds for thermoplasts. Thus, more or less overflowing during injection is experienced. As a consequence, the thermoplastic parts and the rubber seals or LSR seals are conventionally manufactured in two separate molds by different processes. The rubber seals or LSR seals are then typically placed into the grooves of the thermoplastic parts through cost-intensive manual work. Hereby, the placement by hand can be carried out in qualitatively very different manner, resulting in a fairly high reject fraction (up to about 15%).

Unlike crosslinked plastics, seals of thermoplastic elastomers can easily be injected in a fully automated way into the grooves of the thermoplastic parts. A drawback associated with thermoplastic elastomer seals is, however, their slight or significantly decreasing restoring capability. A repeated dismantling and assembly of thermoplastic parts with seals of thermoplastic elastomers is thus only possible to a very limited extent.

A further problem associated with seals of thermoplastic elastomers is the risk of detachment of the seal from the thermoplastic part during handling, when the seal does not have sufficient adhesion to the thermoplastic part.

SUMMARY OF THE INVENTION

It is thus an object of the invention, to provide a thermoplastic part which has an injected seal that is held reliably in the thermoplastic part and preferably retains its sealing properties even when the thermoplastic part is repeatedly dismantled and assembled as well as upon exposure to high temperatures.

A further object of the invention is the provision of a process, suitable for automation, for manufacturing such a thermoplastic part.

It is further an object of the invention to create an apparatus for carrying out this process.

The thermoplastic part according to the invention is characterized by mechanically anchoring the injected seal in the provided groove through one or more undercuts.

The process for manufacturing a thermoplastic part with injected seal from a crosslinked plastic includes a first step for manufacturing the thermoplastic part with a groove for receiving the seal, a second step for formation of undercuts, and a further step for injecting the elastomer into the groove. To prevent overflow during injection, sealing profiles may be formed on both sides of the groove on the thermoplastic part in the first step for sealing the groove during injection of the crosslinked plastic, or a mold can be used in the second step, having a core which includes sealing projections suited to the groove. Preferably, the sealing profiles and the sealing projections are pointed profiles of triangular cross section. When the sealing profiles are part of the thermoplastic part, they can be shaped in the direction of the interior of the groove either in the second step, during the closing of the shaping mold, so that undercuts are realized for holding the seal. When being arranged on the core, the sealing projections can be used to shape the edges of the groove toward the interior of the groove to thereby create the undercuts for anchoring the seal in the groove. Depending on the properties of the elastomer to be injected, the use of the sealing profiles and sealing projections may be omitted and the groove edges only are molded into undercuts.

The above-described process is carried out by an injection molding apparatus having at least one female mold and at least two cores, with the female mold and the first core defining a mold for injection molding the thermoplastic part, and the female mold and the second core defining a mold for injection molding the elastomer seal. Hereby, the second core can be heated entirely or partially, and either the first core is so configured that sealing profiles are molded on the thermoplastic part on both sides of the groove for sealing the groove in cooperation with the second mold during injection of the elastomer, or the second core has sealing projections which seal the groove on both sides during injection of the elastomer.

Preferably, the second core has a zone which is partly suited to the groove and is insulated from the remaining zones of the core and can be heated to about 170–230° C. The heatable zone may also be implemented by an insert or several partial inserts which can be placed in the second core. The injection molding apparatus may include a device for automatically changing the cores. Preferably, the injection molding apparatus is a two-component machine.

BRIEF DESCRIPTION OF THE DRAWING

Embodiments of the invention will now be described in more detail with reference to the following figures, in which:

FIGS. 1–4 show various embodiments of the thermoplastic part. Shown are cross sections through the region of the groove and the seal for an intermediate product (1b, 2b, 3b, 4b) and the end product (1a, 2a, 3a, 4a).

DETAILED DESCRIPTION OF PREFERRED EMBODIMENTS

Figure 5B:
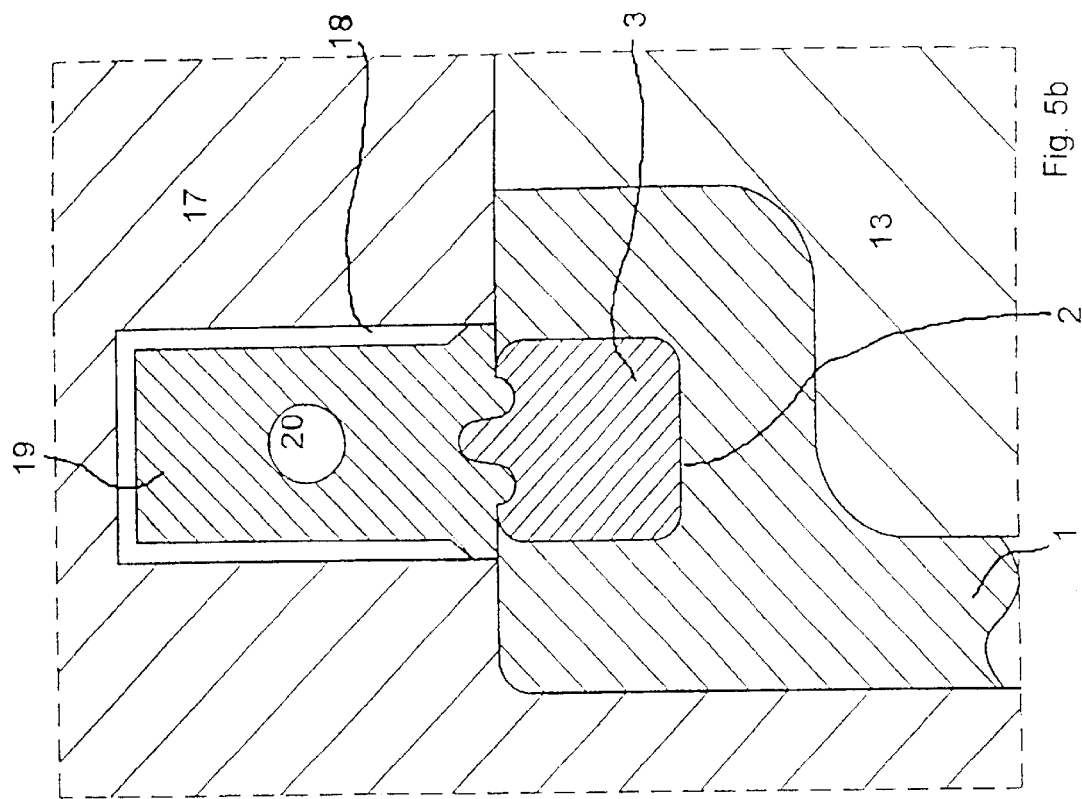
FIG. 5 shows the manufacturing step for the intermediate product and the end product as well as the schematic configuration of the injection molding molds.

FIGS. 1b, 2b, 3b, 4b show cross sections of various embodiments of the thermoplastic part 1 according to the invention in the area of the seal 3. The seal 3, made of a crosslinked plastic (e.g. rubber or LSR), is disposed in the groove 2 of the thermoplastic part 1 and fills it completely. On the open side of the groove, the seal 3 has a sealing lip 5 which projects beyond the end surface 4 of the thermoplastic part, as well as two notches 7 extending parallel to the sealing lip 5 and recessed with respect to the end surface 4. In the exemplified embodiments of FIGS. 1a, 2a and 4a, the edges of the groove 2 have undercuts 6 in the direction of the interior of the groove 2 for securing the seal 3 in the groove 2. When such a securement is not required, or when the securement of the seal 3 in the groove 2 is realized by bonding agents or chemical bond, the undercuts 6 may be omitted (cf. FIG. 3a). It is also possible to provide, for example, indentations 8, 8' in the end surface 4 of the thermoplastic part 1 for receiving complementary counterpieces to secure the thermoplastic part against shifting.

Various embodiments of the manufacturing process for the thermoplastic part according to the invention will now be described with reference to FIGS. 1a–4a and 1b–4b. Each of FIGS. 1b, 2b, 3b, and 4b shows hereby an intermediate step of the process, namely the thermoplastic part 1 before the injection of the seal 3 into the groove 2. The thermoplastic part 1 is made by way of a conventional injection molding process, with a groove 2 being hollowed out for receiving the seal 3. In order to be able to inject the rubber seal or LSR seal in a further step of the process according to the invention without overflow during injection, sealing profiles 10 are formed, during injection of the thermoplastic part 1 in the first exemplified embodiment of the process according to the invention, on both sides of the groove in parallel relationship to the groove, for sealing the groove 2 during injection of the rubber or LSR. Preferably, the sealing profiles 10 have a pointed configuration. The groove-confronting side 12 of the sealing profiles may extend vertically and terminate in the sidewall 9 of the groove 2 (cf. FIGS. 1b and 2b). During closing operation, before injection of the rubber or the LSR, the sealing profiles 10 are shaped toward the interior of the groove to form the undercuts 6 (cf. FIGS. 1a and 2a). In the event sealing profiles are omitted, the groove edges are respectively shaped.

According to a further embodiment of the process for manufacturing the thermoplastic part 1 according to the invention with a seal 3 of crosslinked plastic, the sealing of the groove 2 is effected during injection of the rubber or the LSR not by the thermoplastic part 1 itself but by the injection mold. The mold is hereby provided with sealing projections, which complement the outline of the surfaces next to the groove 2, for sealing the groove 2 during injection of the rubber or the LSR. Preferably, these sealing projections shape the edges of the groove 2 in the direction of the interior of the groove during closing of the mold, before injection of the rubber or the LSR for forming the undercuts 6 (cf. FIG. 4).

The mold is partially heated at the second core for injection of the crosslinked plastic for formation of the seal 2. The temperature of this region ranges hereby between 170 and 230° C. Preferably, heating of the mold is restricted to a region which matches the profile of the groove 2, and this region is thermally insulated from the remainder of the mold to prevent exposure of the entire thermoplastic part 1 to the high temperature in the second phase. Heating of the mold in the area of the groove may also be exploited to facilitate the shaping of the sealing profiles 10 or the groove edges 11.

Referring to FIG. 5, an exemplified embodiment of an apparatus for manufacturing a thermoplastic part with injected seal of a crosslinked plastic will now be described.

The apparatus is an injection mold in an injection molding machine, preferably a two-component machine, with a clamping unit having at least one female mold 13 and two cores 15, 17. Core 15 defines together with the female mold 13 the mold for injection molding the thermoplastic part.

Together with the core 17, the female mold 13 defines the mold for injecting the seal 3. An automated device for transport of thermoplastic parts from the cavity for the first phase into the cavity of the second phase may also be provided. Examples of such a device include rotary tables, robots and slide plates.

Figure 5A:
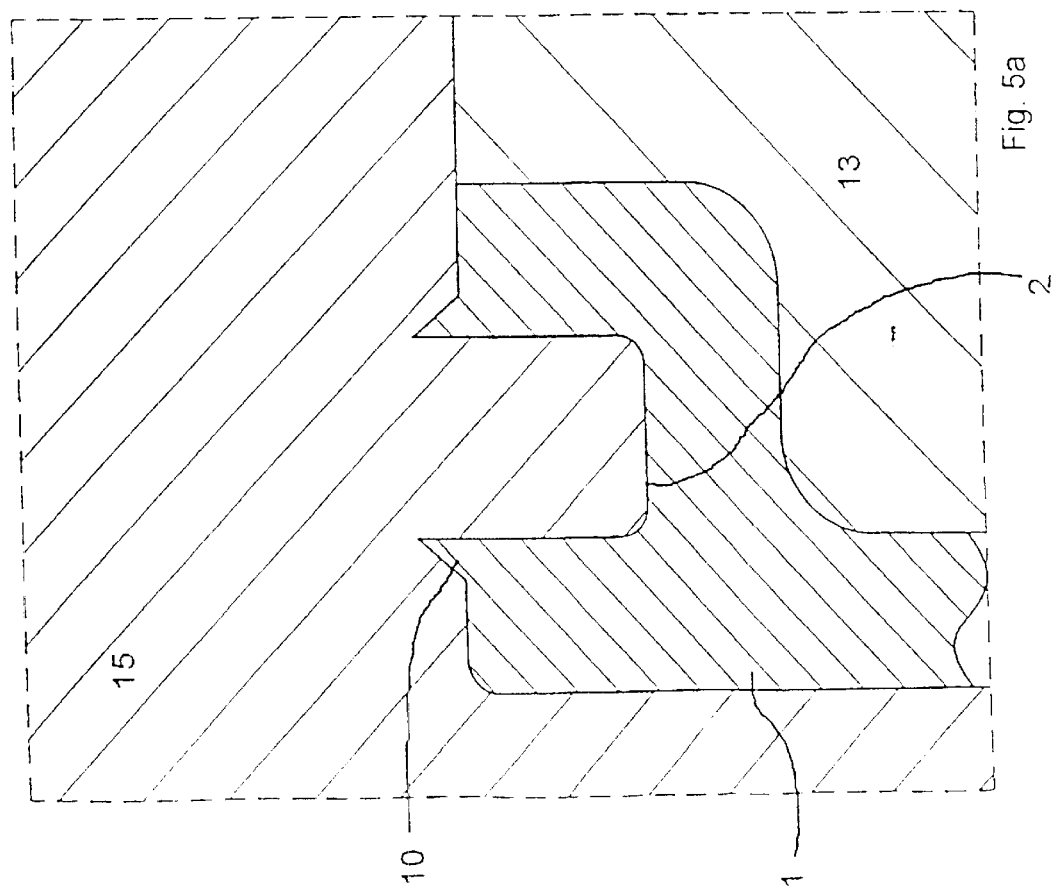

The first core 15 is so configured that the groove 2 is hollowed out during injection molding of the thermoplastic part (cf. FIG. 5a). It may, moreover, also be so configured that the sealing profiles 10 are also shaped during injection molding. In the area of the groove 2, the core 17 for injecting the seal of a crosslinked plastic has a region 19 which is thermally insulated from the remainder of the core (FIG. 5b). The insulation may, e.g., be realized by an insulation gap 18. Heating means 20 are provided in the insulated region 19 and may include, e.g., an electric heater or a heating channel for heating oil. The insulated region 19 may be formed either in one piece with the second core, or by an insert which can be pushed in a respective recess in the second core. The insert may also be made of several partial inserts. The insulated region 19 or the insert is so configured as to form the molded part for the seal of crosslinked plastic.

There is no need that the apparatus for manufacturing the thermoplastic part with injected seal of crosslinked plastic is made of a single injection molding machine. Rather, both steps, molding of the thermoplastic part and injecting the seal, may be implemented by two separate machines. It is also not necessary that the first core 15 is appropriate for shaping the sealing profiles 10. The sealing profiles may instead also be formed at the second core 17. In particular, it is possible to provide the insulated region 19 or the insert with sealing projections which, preferably, have a pointed configuration.

The described apparatus, the process and the thermoplastic part are also not limited to a seal of crosslinked plastics, but may advantageously be used also with thermoplastics.

What is claimed is:

1. A process for making a thermoplastic part, comprising the steps of:
   molding a thermoplastic part with a groove and at least one undercut for bounding an edge of the groove; and
   injecting an elastomer into the groove to form a seal which is retained in place by the undercut, and heating a mold core in a region covering the groove to a temperature of 170° C. to 230° C., while leaving a remaining area of the mold core at a lower temperature than the region covering the groove.

2. The process of claim 1, wherein during molding of the thermoplastic part sealing profiles are shaped in one piece with the thermoplastic part in vicinity of the groove to define the undercut and to seal the groove against overflow during injection of the elastomer, with the sealing profiles being shaped in one of the phases selected from the group consisting of before injection of the elastomer and during injection of the elastomer.

3. The process of claim 2, wherein the sealing profiles are shaped as pointed profiles with relatively pointed cross section.

4. The process of claim 3, wherein the sealing profiles are formed with vertical legs which face the groove and terminate in the sidewall of the groove.

5. The process of claim 1, wherein crosslinked plastic is injected as elastomer.

6. The process of claim 5, wherein the crosslinked plastic is selected from the group consisting of rubber and LSR.

7. The process of claim 1, wherein a thermoplastic elastomer is injected.

8. An injection molding apparatus for making a thermoplastic part, comprising:

at least one female mold; and at least two cores;

wherein the female mold and a first one of the cores define an injection mold for injection molding a thermoplastic part with a groove, wherein the female mold and a second one of the cores define an injection mold for injection molding an elastomer seal into the groove of the thermoplastic part and for formation of at least one undercut for bounding an edge of the groove to thereby hold the elastomer seal in the groove, wherein the second core includes a region which matches a profile of the groove and is heatable to a temperature of 170° C.–230° C., and which is thermally insulated from a remaining region of the second core.

9. The injection molding apparatus of claim 8, wherein the heatable region is made of at least one insert.

10. The injection molding apparatus of claim 8, wherein the first core is configured to mold sealing profiles in one piece with the thermoplastic part during molding of the thermoplastic part in vicinity of the groove, for sealing the groove during injection of the elastomer against overflowing, and wherein the second core is configured to shape the sealing profiles in one of the phases selected from the group consisting of before injection of the elastomer and during injection of the elastomer into the undercut.

11. The injection molding apparatus of claim 8, wherein the second core has sealing projections which seal the groove during injection of the elastomer against overflowing and which mold the groove edge in one of the phases selected from the group consisting of before injection of the elastomer and after injection of the elastomer into the undercut.

12. The injection molding apparatus of claim 8, and further comprising a two-component mold and a two-component machine.

13. The injection molding apparatus of claim 8, and further comprising a device for automated transfer of the thermoplastic part from a first cavity for a first phase to a second cavity for a second phase.

14. The injection molding apparatus of claim 13, wherein the device for automated transfer of the thermoplastic parts includes a member selected from the group consisting of rotary table, robot, and sliding plate.

* * * * *

UNITED STATES PATENT AND TRADEMARK OFFICE
CERTIFICATE OF CORRECTION

PATENT NO. : 6,579,487 B1
DATED : June 17, 2003
INVENTOR(S) : Lichtinger et al.

It is certified that error appears in the above-identified patent and that said Letters Patent is hereby corrected as shown below:

<u>Title page,</u>
Item [73], correct assignee's data as follows:

-- Krauss-Maffei Kunststofftechnik GmbH, München (DE) --

Signed and Sealed this

Twenty-third Day of December, 2003

JAMES E. ROGAN
*Director of the United States Patent and Trademark Office*